(12) United States Patent
Gralewicz

(10) Patent No.: US 11,163,378 B2
(45) Date of Patent: Nov. 2, 2021

(54) ELECTRONIC DEVICE AND OPERATING METHOD THEREFOR

(71) Applicant: Samsung Electronics Co., Ltd., Suwon-si (KR)

(72) Inventor: Przemyslaw Gralewicz, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/976,334

(22) PCT Filed: Jul. 3, 2018

(86) PCT No.: PCT/KR2018/007495
§ 371 (c)(1),
(2) Date: Aug. 27, 2020

(87) PCT Pub. No.: WO2019/216484
PCT Pub. Date: Nov. 14, 2019

(65) Prior Publication Data
US 2021/0048895 A1 Feb. 18, 2021

(30) Foreign Application Priority Data
May 8, 2018 (KR) ........................ 10-2018-0052787

(51) Int. Cl.
*G06F 3/023* (2006.01)
*H04N 5/232* (2006.01)
(Continued)

(52) U.S. Cl.
CPC .......... *G06F 3/0237* (2013.01); *G06F 3/0236* (2013.01); *G06F 3/0482* (2013.01);
(Continued)

(58) Field of Classification Search
CPC .. G06F 3/0237; G06F 3/0236; G06F 3/04817; G06F 3/0482; G06K 9/00671; G06T 11/60; H04N 5/232935
See application file for complete search history.

(56) References Cited

U.S. PATENT DOCUMENTS

| 9,251,428 B2 | 2/2016 | Rozumyanskiy et al. |
| 2009/0112572 A1 | 4/2009 | Thorn |

(Continued)

FOREIGN PATENT DOCUMENTS

| KR | 10-2010-0135050 A | 12/2010 |
| KR | 10-2015-0007800 A | 1/2015 |
| KR | 10-2018-0044187 A | 5/2018 |

OTHER PUBLICATIONS http://galaxys5guide.com/samsung-galaxy-s5-how-to-guides/how-to-use-galaxy-s5-samsung-keyboard/ Samsung Galaxy S5 Guide, Apr. 11, 2014.

(Continued)

*Primary Examiner* — Seth A Silverman
(74) *Attorney, Agent, or Firm* — Jefferson IP Law, LLP

(57) ABSTRACT

Provided is an electronic device including a camera configured to capture an image of at least one object, a display, a memory storing one or more instructions, and a processor configured to execute the one or more instructions stored in the memory to recognize at least one text included in the image received from the camera, generate one or more recommendation words having a priority based on the recognized at least one text and context information, and control the display to display the generated one or more recommendation words, according to the priority.

17 Claims, 11 Drawing Sheets

(51) Int. Cl.
  *G06F 40/30* (2020.01)
  *G06F 3/0481* (2013.01)
  *G06F 3/0482* (2013.01)
  *G06K 9/00* (2006.01)
  *G06T 11/60* (2006.01)

(52) U.S. Cl.
  CPC .......... *G06F 3/04817* (2013.01); *G06F 40/30* (2020.01); *G06K 9/00671* (2013.01); *G06T 11/60* (2013.01); *H04N 5/232935* (2018.08); *G06T 2200/24* (2013.01)

(56) References Cited

U.S. PATENT DOCUMENTS

| | | |
|---|---|---|
| 2012/0245922 A1 | 9/2012 | Kozlova et al. |
| 2013/0234945 A1* | 9/2013 | Goktekin ................ G06F 3/005 345/168 |
| 2016/0196055 A1* | 7/2016 | Park .................... G06F 3/04845 715/768 |
| 2018/0067957 A1* | 3/2018 | Paterson ................. G06F 16/13 |
| 2018/0083901 A1 | 3/2018 | McGregor, Jr. et al. |
| 2020/0125797 A1 | 4/2020 | Song et al. |

OTHER PUBLICATIONS https://www.youtube.com/watch?v=Bse99YMeeoE Oct. 14, 2012.
Wang et al., The Attraction of Visual Attention to Texts in Real-World Scenes, Jun. 2012.
Huang et al., Detecting Arbitrary Oriented Text in the Wild with a Visual Attention Model, Oct. 2016.
Stentiford, Visual Attention: low level and high level viewpoints, Apr. 2012.
International Search Report dated Jan. 25, 2019, issued in International Application No. PCT/KR2018/007495.
European Search Report dated Oct. 28, 2020, issued in European Application No. 18918261.1.

\* cited by examiner

FIG. 1
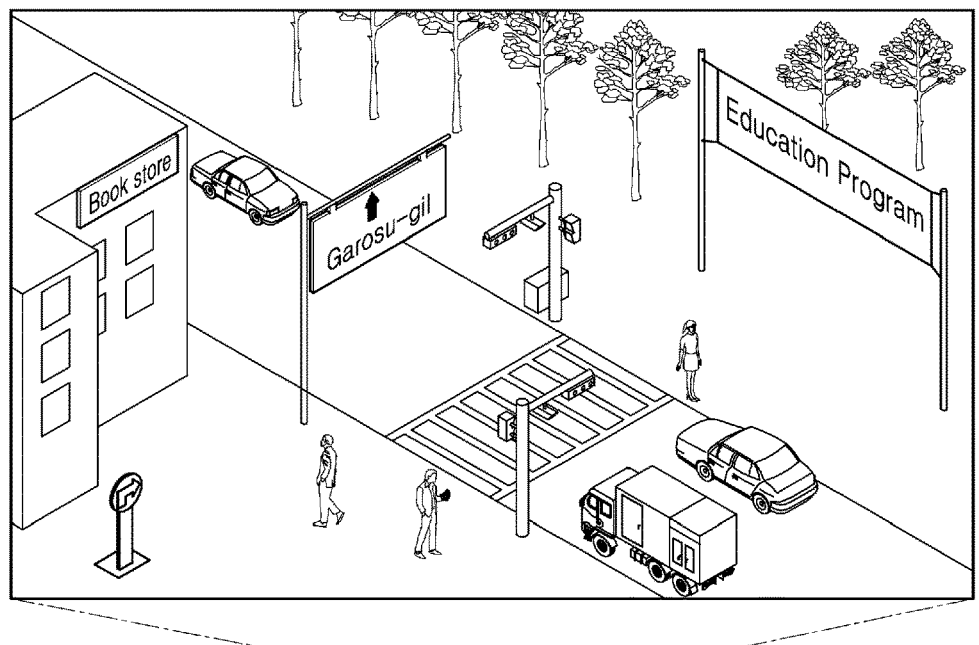
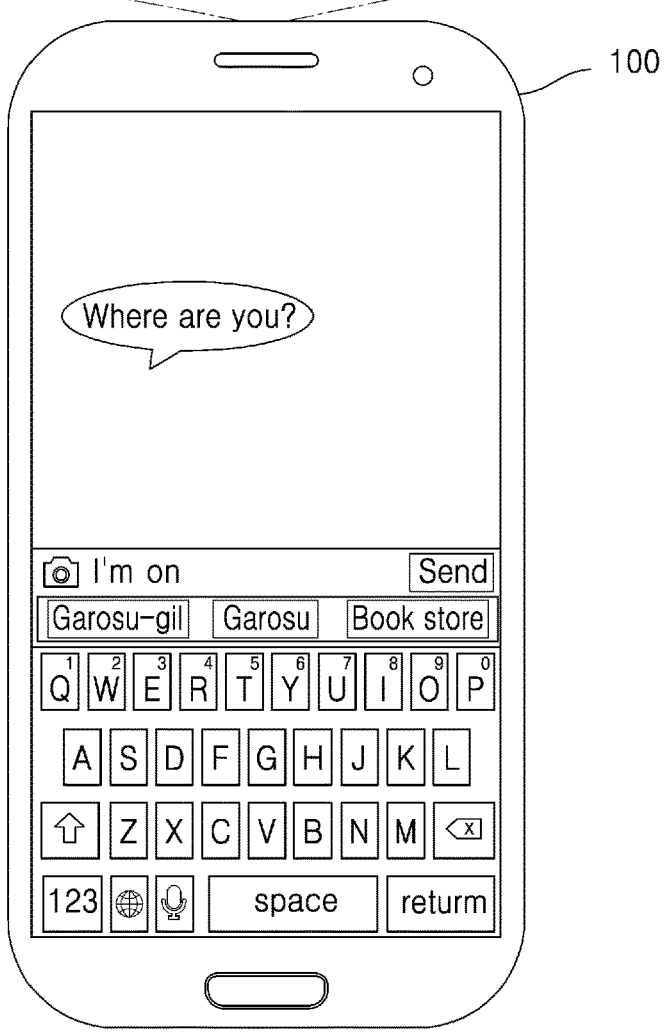

FIG. 6
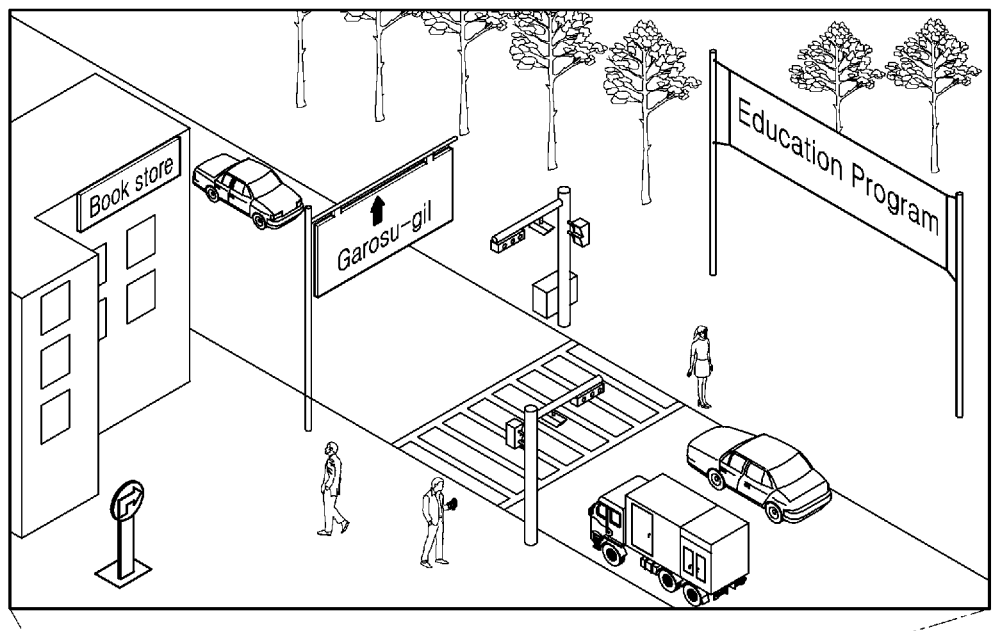
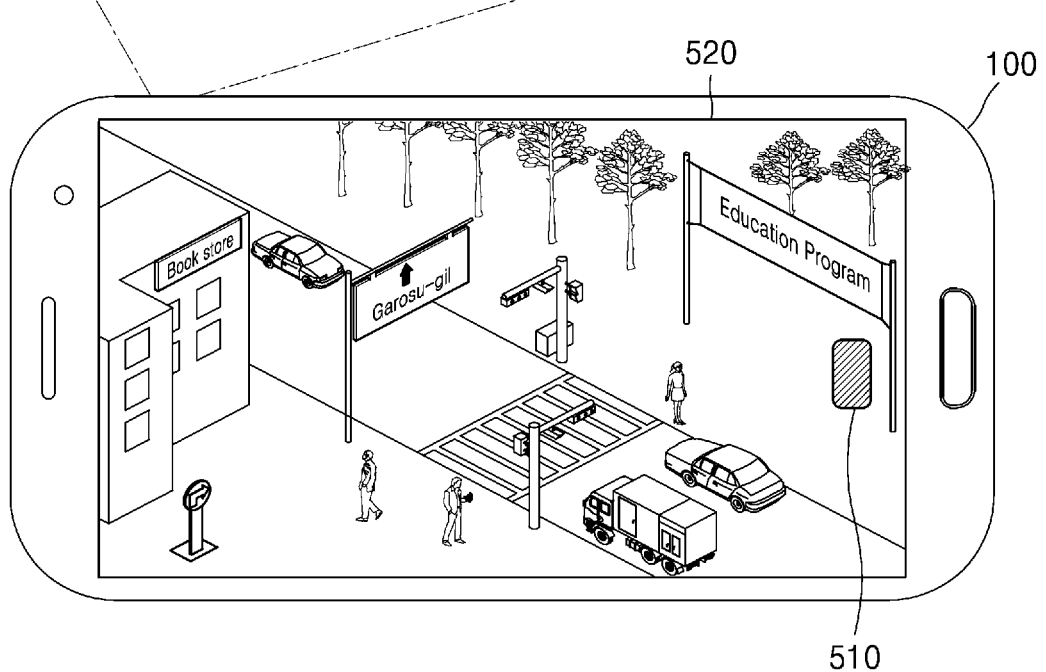

ELECTRONIC DEVICE AND OPERATING METHOD THEREFOR

TECHNICAL FIELD

Various embodiments relate to an electronic device and an operating method of the same, and more particularly, to an electronic device capable of providing at least one recommendation word based on at least one text recognized in an image, and an operating method of the same.

BACKGROUND ART

With advancements in information communication technology and semiconductor technology, various electronic devices are developing into multimedia devices that provide various multimedia services. For example, electronic devices provide various multimedia services such as a messenger service, a broadcasting service, a wireless Internet service, a camera service, and a music playback service.

In particular, an electronic device enables easy imaging of the surrounding environment by using a camera. In addition, the electronic device may output a result of recognizing characters included in an image, by using optical character recognition (OCR) technology for automatically recognizing characters in an image.

However, while text is being input, when text is to be input by recognizing characters included in the image by using the OCR function, it is cumbersome, and there is a drawback in that a result of character recognition using OCR is not satisfactory.

DESCRIPTION OF EMBODIMENTS

Technical Problem

Various embodiments may provide an electronic device capable of recognizing text in an image, and generating and displaying recommendation words based on the recognized text and context information, and an operating method of the same.

Solution to Problem

According to an embodiment, an electronic device includes a camera configured to capture an image of at least one object, a display, a memory storing one or more instructions, and a processor configured to execute the one or more instructions stored in the memory to recognize at least one text included in the image received from the camera, generate one or more recommendation words having a priority based on the recognized at least one text and context information, and control the display to display the generated one or more recommendation words, according to the priority.

According to an embodiment, an operating method of the electronic device may include obtaining an image by capturing the image of at least one object, recognizing at least one text included in the image, generating one or more recommendation words having a priority, based on the recognized at least one text and context information, and displaying the generated one or more recommendation words, according to the priority.

ADVANTAGEOUS EFFECTS OF DISCLOSURE

According to an embodiment, the electronic device may input words solely by capturing images instead of typing in a text input mode, so that usage convenience of a user may be enhanced.

According to an embodiment, the electronic device may recommend words matching a user's intention by changing recognized text to words matching context information.

BRIEF DESCRIPTION OF DRAWINGS

FIG. 1 is a diagram illustrating an electronic device, according to an embodiment.

FIGS. 5 to 10 are diagrams referenced for describing an operating method of the electronic device, according to embodiments.

BEST MODE

Figure 2:
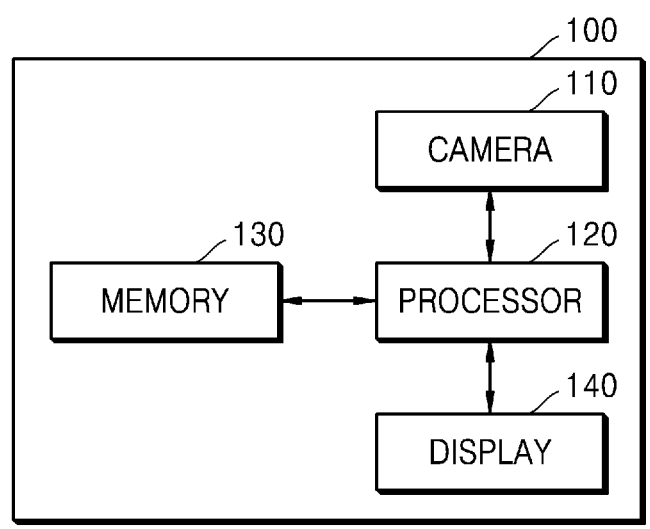
FIG. 2 is a block diagram illustrating a configuration of the electronic device, according to an embodiment.

According to an embodiment, an electronic device includes a camera configured to capture an image of at least one object, a display, a memory storing one or more instructions, and a processor configured to execute the one or more instructions stored in the memory, wherein the processor, by executing the one or more instructions, is further configured to recognize at least one text included in the image received from the camera, generate one or more recommendation words having a priority based on the recognized at least one text and context information, and control the display to display the generated one or more recommendation words, according to the priority.

According to an embodiment, the processor may be further configured to, when the electronic device operates in a text input mode, control the display to display a text input window and a capture icon, and when receiving a user input of selecting the capture icon, to drive the camera, and control the camera to capture the image of the at least one object.

According to an embodiment, the processor may be further configured to change the at least one text that is recognized, into a word matching the context information by using a language model.

According to an embodiment, the processor may be further configured to determine a priority of the recognized at least one text, based on at least one of a position in the image of the at least one text, a size of the at least one text, a color of the at least one text, or a type of the at least one text.

According to an embodiment, the processor may be further configured to determine a priority of the one or more recommendation words, based on a category of the recognized at least one text and context information of text input to the electronic device.

According to an embodiment, when the electronic device is in a state of transmitting and receiving a message with an external device, the context information may include at least one of time information of the electronic device, location information of the electronic device, information about the external device, contents of a message received from the external device, or contents of a message input to a message input area.

According to an embodiment, the processor may be further configured to control the display to display the one or more recommendation words that are generated, on the display in an order from a highest priority.

According to an embodiment, the processor may be further configured to, when receiving a user input of selecting any one of the one or more recommendation words that are generated, control the selected recommendation word to be input to a text input window.

According to an embodiment, an operating method of the electronic device may include obtaining an image by capturing the image of at least one object, recognizing at least one text included in the image, generating one or more recommendation words having a priority, based on the recognized at least one text and context information, and displaying the generated one or more recommendation words, according to the priority.

According to an embodiment, the method may further include displaying a text input window and a capture icon, when the electronic device operates in a text input mode, wherein the obtaining of the image by capturing the image of the at least one object includes, when receiving a user input of selecting the capture icon, driving a camera and capturing the at least one object.

According to an embodiment, the generating of the one or more recommendation words having the priority may include changing the recognized at least one text into a word matching the context information, by using a language model.

According to an embodiment, the recognizing of the at least one text included in the image may include determining a priority of the recognized at least one text, based on at least one of a position in the image of the at least one text, a size of the at least one text, a color of the at least one text, or a type of the at least one text.

According to an embodiment, the generating of the one or more recommendation words having the priority may include determining a priority of the one or more recommendation words, based on a category of the recognized at least one text and context information of text input to the electronic device.

According to an embodiment, when the electronic device is in a state of transmitting and receiving a message with an external device, the context information may include at least one of time information of the electronic device, location information of the electronic device, information about the external device, contents of a message received from the external device, or contents of a message input to a message input area.

According to an embodiment, the displaying of the generated one or more recommendation words according to the priority may include displaying the one or more recommendation words on the display in an order from a highest priority.

According to an embodiment, the method may further include receiving a user input of selecting any one of the one or more recommendation words, and inputting the selected recommendation word to a text input window.

MODE OF DISCLOSURE

Terms used in the specification will be briefly described, and the disclosure will be described in detail.

The terms used in the disclosure have been selected, while considering the functions in the disclosure, general terms that are currently widely used are selected, but this may vary according to the intention or precedent of a person of skill in the art or the appearance of new technologies. In addition, in certain cases, some terms are arbitrarily selected by the applicant, and in this case, their meanings will be described in detail in the applicable descriptions of the disclosure. Therefore, the term used in the disclosure should be defined based on the meaning of the term and the entire contents of the disclosure, not a simple term name.

When a certain part of the specification "includes" a certain component, this means that other components may be further included rather than excluding other components unless specifically stated to the contrary. In addition, terms such as " . . . unit" and "module" described in the specification mean a unit that processes at least one function or operation, which may be implemented in hardware or software, or a combination of hardware and software.

Hereinafter, embodiments will be described in detail with reference to the accompanying drawings so that one of skill in the art to which the disclosure pertains may easily practice the embodiments. However, the disclosure may be implemented in many different forms and is not limited to the embodiments described herein. In addition, in order to clearly describe the disclosure in the drawings, parts irrelevant to the description are omitted, and like reference symbols are assigned to similar parts throughout the specification.

FIG. 1 is a diagram illustrating an electronic device, according to an embodiment.

According to an embodiment, the electronic device 100 may be implemented in various forms. For example, the electronic device may be implemented in various electronic devices, including mobile phones, smart phones, laptop computers, desktops, tablet personal computers (PC), e-book terminals, digital broadcasting terminals, personal digital assistants (PDA), and portable multimedia players (PMP), navigations, MP3 players, camcorders, Internet protocol televisions (IPTV), digital televisions (DTV), and wearable devices. However, the electronic device 100 is not limited thereto.

In one or more embodiments, the term "user" refers to a person who controls functions or operations of an electronic device, which may include an administrator or an installation engineer.

According to an embodiment, the electronic device 100 may include a camera that captures an image of at least one object. According to an embodiment, the electronic device 100 may perform image-capturing by using a camera in the text input mode, as illustrated in FIG. 1. For example, the text input mode may include a mode for inputting text to send a text message or instant message to an external device, a mode for inputting text by executing an application capable of inputting text, such as a memo application, and a mode for inputting text to send an e-mail. However, the text input mode is not limited thereto. According to an embodiment, the electronic device 100 may display a text input window and a camera icon in the text input mode.

In the text input mode, when a user input (for example, an input of touching the camera icon) requesting image-capturing is received, the electronic device 100 may drive the camera to capture an image of at least one object, and display, as a preview image, the image captured by the camera.

In addition, the electronic device 100 may include an optical character recognition (OCR) module, and may perform the OCR function by using the OCR module. The OCR function is for reading characters by using light, which is a function of recognizing at least one text included in an image. According to an embodiment, the electronic device 100 may recognize at least one text by using the OCR function, the at least one text being included in the image captured by the camera.

In addition, the electronic device 100 may determine a priority of the recognized text, based on the similarity between a shape of the recognized text and a shape of the text before recognition, a position in the image of the recognized text, a size of the text, an orientation of the text, a color of the text, a font, whether the recognized text is printed text or handwritten text, a type of language in the text, a category of the text, or the like. However, the embodiment is not limited thereto.

For example, the electronic device 100 may set the highest priority for text recognized at a location closest to a center point of the image from among the recognized texts. Alternatively, the electronic device 100 may set the highest priority for the text of the largest size from among the recognized texts. Alternatively, the electronic device 100 may set the highest priority for text whose orientation is closest to a horizontal orientation from among the recognized texts. However, the embodiment is not limited thereto.

According to an embodiment, the electronic device 100 may generate one or more recommendation words by changing the recognized text into words matching the context information by using a language model. In addition, the electronic device 100 may determine a priority of recommendation words by using the language model.

The language model may be a model that models a language used by human to calculate, as a probability, a degree to which a particular word string corresponds to an actually used language. The language model may be a model that predicts words or letters that are grammatically appropriate or highly probable, based on a dictionary, frequency of use, probability of use, and the like. For example, in a case of a language model of a character or word unit, the language model may predict the next letter or word, based on the letters or words input so far. In addition, in a case of a language model of a sentence unit, the language model may predict a word included in a sentence in consideration of a comprehensive meaning or context of the sentence or paragraph.

The language model may be a model based on a neural network. For example, a model such as a deep neural network (DNN), a recurrent neural network (RNN), or a bidirectional recurrent deep neural network (BRDNN) may be used as the language model, but is not limited thereto.

Further, the context information may include time information of the electronic device, location information of the electronic device, information about the other party of the messaging, the contents of a message received from the other party, and the contents of a message input to a message input area. However, the context information is not limited thereto.

According to an embodiment, the electronic device 100 may change at least one text recognized in the image into one or more words matching the context information, by using the language model. In addition, the electronic device 100 may re-determine a priority of the one or more words by using the language model.

According to an embodiment, the electronic device 100 may display the recommendation words on a display according to priority, and may display the recommendation words in an order from the highest priority.

FIG. 2 is a block diagram illustrating a configuration of the electronic device 100, according to an embodiment.

Referring to FIG. 2, according to an embodiment, the electronic device 100 may include a camera 110, a processor 120, a memory 130, and a display 140.

According to an embodiment, the camera 110 may obtain an image frame such as a still image or video through an image sensor. An image captured through the image sensor may be processed by the processor 120 or separate image processor (not illustrated). An image frame processed in the camera 110 may be stored in the memory 130 or transmitted to an external device. Two or more cameras 110 may be provided according to a configuration aspect of the electronic device 100.

According to an embodiment, the camera 110 may capture an image of at least one object including text, and process the captured image by using the processor 120.

According to an embodiment, the processor 120 may execute one or more programs stored in the memory 130. The processor 120 may include a single core, dual core, triple core, quad core, and/or a multi-core. In addition, the processor 120 may include a plurality of processors. For example, the processor 120 may be implemented as a main processor (not illustrated), and a sub processor (not illustrated) operating in a sleep mode.

According to an embodiment, the memory 130 may store various data, programs or applications for driving and controlling the electronic device 100.

In addition, the programs stored in the memory 130 may include one or more instructions. The programs (one or more instructions) or applications stored in memory 130 may be executed by the processor 120.

According to an embodiment, the processor 120 may recognize at least one text in the image received from the camera 110, by executing the one or more instructions stored in the memory 130.

For example, the processor 120 may recognize text included in the image by using the OCR function. In addition, the processor 120 may divide the captured image into a plurality of areas, and recognize text by area. At this time, a priority of the plurality of areas may be determined based on whether a shape appearing in each of the plurality of areas is similar to the text and a location of each of the areas. In addition, text that is recognized in each of the plurality of areas having a priority may have the same priority as their corresponding areas. Alternatively, the processor 120 may determine a priority of the recognized text, based on whether a shape of text appearing in the image is similar to the text, a position in the image of the text, a size of the text, an orientation of the text, a color of the text, a font, whether the recognized text is printed text or handwritten text, a type of language in the text, a category of the text, or the like. However, the embodiment is not limited thereto.

The processor 120 may generate one or more recommendation words having a priority, based on the recognized text and the context information. For example, the processor 120 may change, by using the language model, at least one recognized text into one or more recommendation words matching the context information. In addition, the processor 120 may re-determine a priority of the words changed to the recommendation words.

According to an embodiment, the display 140 generates a driving signal by converting an image signal, data signal, on-screen display (OSD) signal, control signal, or the like processed by the processor 120. The display 140 may be implemented as a plasma display panel (PDP), a liquid-crystal display (LCD), an organic light-emitting diode (OLED), a flexible display, or the like, and may also be implemented as a three-dimensional (3D) display. In addition, the display 140 may be configured as a touch screen and used as an input device in addition to an output device.

According to an embodiment, the display 140 may display images captured by the camera 110. In addition, the display 140 may display the generated recommendation words according to priority. For example, the display 140 may display the recommendation words in an order from the high priority.

Figure 3:
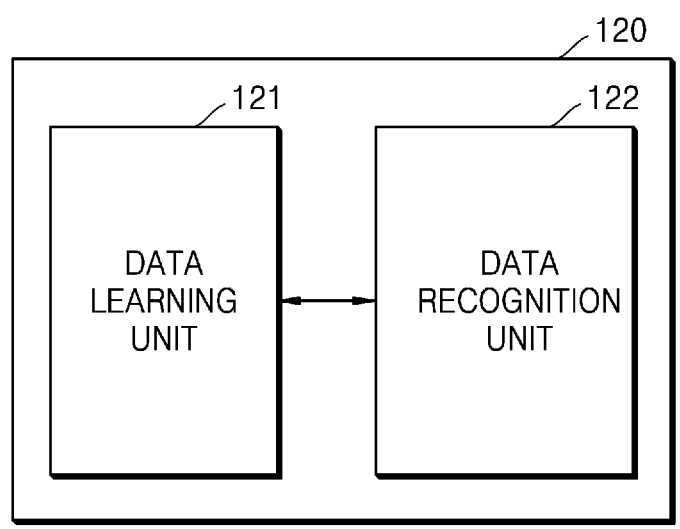
FIG. 3 is a block diagram illustrating a configuration of a processor of FIG. 2.

FIG. 3 is a block diagram illustrating a configuration of a processor of FIG. 2.

Referring to FIG. 2, according to some embodiments, the processor 120 may include a data learning unit 121 and a data recognition unit 122.

The data learning unit 121 may learn criteria for changing text recognized in an image into words matching the context (e.g., recommendation words). The data learning unit 121 may learn criteria for what data to use to generate recommendation words and how to generate recommendation words by using the data. The data learning unit 121 may learn criteria for generating recommendation words by obtaining data to be used for training, and applying the obtained data to a language model, which will be described at a later time.

The data recognition unit 122 may generate recommendation words based on the data. The data recognition unit 122 may generate recommendation words from preset data by using a trained language model. The data recognition unit 122 may obtain preset data (for example, at least one text recognized in the image, context information, or the like) according to the preset criteria obtained through learning, and utilize the language model by using the obtained data as an input value, so that recommendation words may be generated based on the preset data. Further, a result value output by the language model by using the obtained data as an input value may be used to refine the language model.

At least one of the data learning unit 121 or the data recognition unit 122 may be manufactured in the form of at least one hardware chip and mounted on the electronic device. For example, at least one of the data learning unit 121 or the data recognition unit 122 may be manufactured in the form of a dedicated hardware chip for artificial intelligence (AI), or may be manufactured as part of existing general-purpose processor (for example, a central processing unit (CPU) or application processor) or a graphics-only processor (e.g., graphics processing unit (GPU)) and mounted on the various electronic devices described above.

In this case, the data learning unit 121 and the data recognition unit 122 may be mounted on one electronic device or may be mounted on separate electronic devices, respectively. For example, one of the data learning unit 121 and the data recognition unit 122 may be included in the electronic device, and the other one may be included in a server. Further, the data learning unit 121 and the data recognition unit 122 may provide, to the data recognition unit 122, model information constructed by the data learning unit 121 by wire or wirelessly, and data input to the data recognition unit 122 may be provided to the data learning unit 121 as additional training data.

Meanwhile, at least one of the data learning unit 121 or the data recognition unit 122 may be implemented as a software module. When at least one of the data learning unit 121 or the data recognition unit 122 is implemented as a software module (or program module including an instruction), the software module may be stored in non-transitory computer-readable media. In addition, in this case, at least one software module may be provided by an operating system (OS) or may be provided by a preset application. Alternatively, some of the at least one software module may be provided by the OS, and others may be provided by the preset application.

Figure 4:
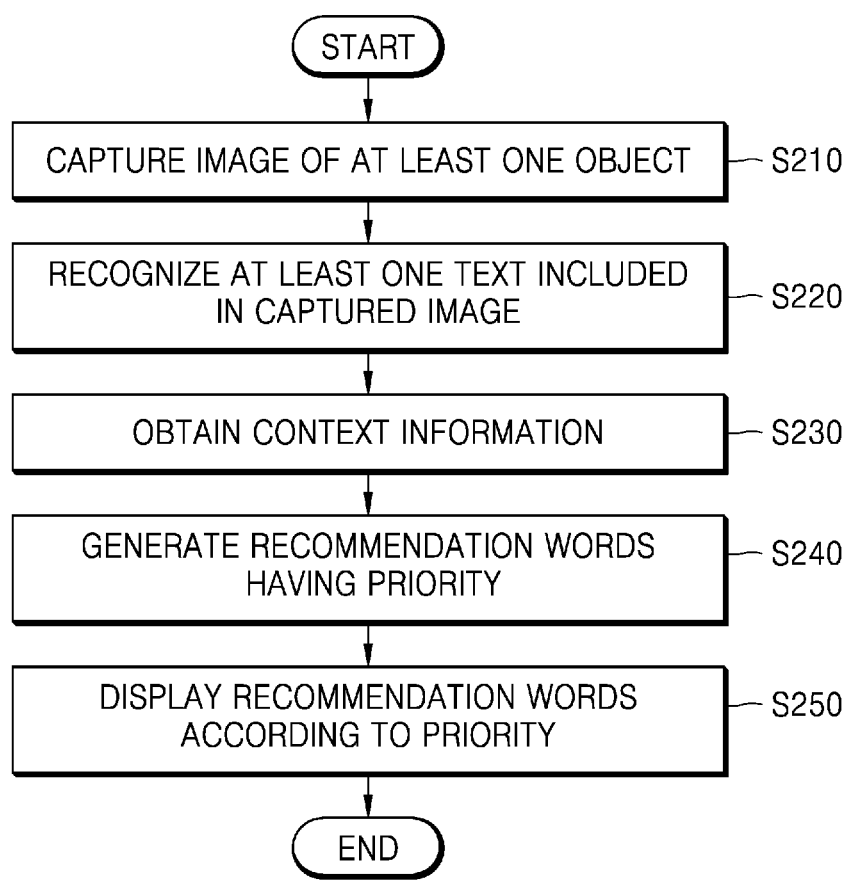
FIG. 4 is a flowchart illustrating an operating method of the electronic device, according to an embodiment.

FIG. 4 is a flowchart illustrating an operating method of the electronic device, according to an embodiment.

Referring to FIG. 4, according to an embodiment, the electronic device 100 may capture an image of at least one object in operation S210. For example, when the electronic device 100 receives a user input for requesting image-capturing, the electronic device 100 may drive the camera to capture an image of at least one object. At this time, an object captured by the camera may include at least one text. In addition, the electronic device 100 may display an image captured by the camera, as a preview image.

According to an embodiment, the electronic device 100 may recognize at least one text included in the captured image, in operation S220. For example, the electronic device 100 may recognize text included in the image by using the OCR function. The electronic device 100 may divide the captured image into a plurality of areas, and perform text recognition by area. At this time, a priority of the plurality of areas may be determined based on whether a shape appearing in each of the plurality of areas is similar to the text or a position of each of the areas. In addition, text that is recognized in each of the plurality of areas having a priority may have the same priority as their corresponding area. For example, when the captured image is divided into a first area, a second area, and a third area, and the first area has the first priority, the second area has the third priority, and the third area has the second priority, first text recognized in the first area may have the first priority, second text recognized in the second area may have the third priority, and third text recognized in the third area may have the second priority. However, the embodiment is not limited thereto.

Alternatively, the electronic device 100 may determine a priority of the recognized text based on whether a shape of text appearing in the image is similar to the text, a position in the image of the text, a size of the text, an orientation of the text, a color of the text, a font, whether the recognized text is printed text or handwritten text, a type of language in the text, a category of the text, or the like. However, the embodiment is not limited thereto. For example, the electronic device 100 may set the highest priority for text recognized at a location closest to a center point of the image from among the recognized texts. Alternatively, the electronic device 100 may set the highest priority for text having the largest size from among the recognized texts. Alternatively, the electronic device 100 may set the highest priority for text whose orientation is closest to a horizontal orientation from among the recognized texts. However, the embodiment is not limited thereto.

According to an embodiment, the electronic device 100 may obtain context information in operation S230.

For example, the electronic device 100 may obtain time information of the electronic device, location information of the electronic device, information about the other party of the messaging, the contents of a message received from the other party, and the contents of a message input in a message input area.

According to an embodiment, the electronic device 100 may generate at least one recommendation word having a priority by using the language model, in operation S240. For example, the electronic device 100 may change the recognized text into one or more words matching the context information by using the language model. In addition, the electronic device 100 may re-determine a priority of the one or more words by using the language model.

According to an embodiment, the electronic device 100 may display at least one recommendation word on a display according to priority, in operation S250. For example, the electronic device 100 may display the at least one recommendation word in an order from the highest priority.

FIGS. 5 to 10 are diagrams referenced for describing an operating method of the electronic device, according to embodiments.

Figure 5:
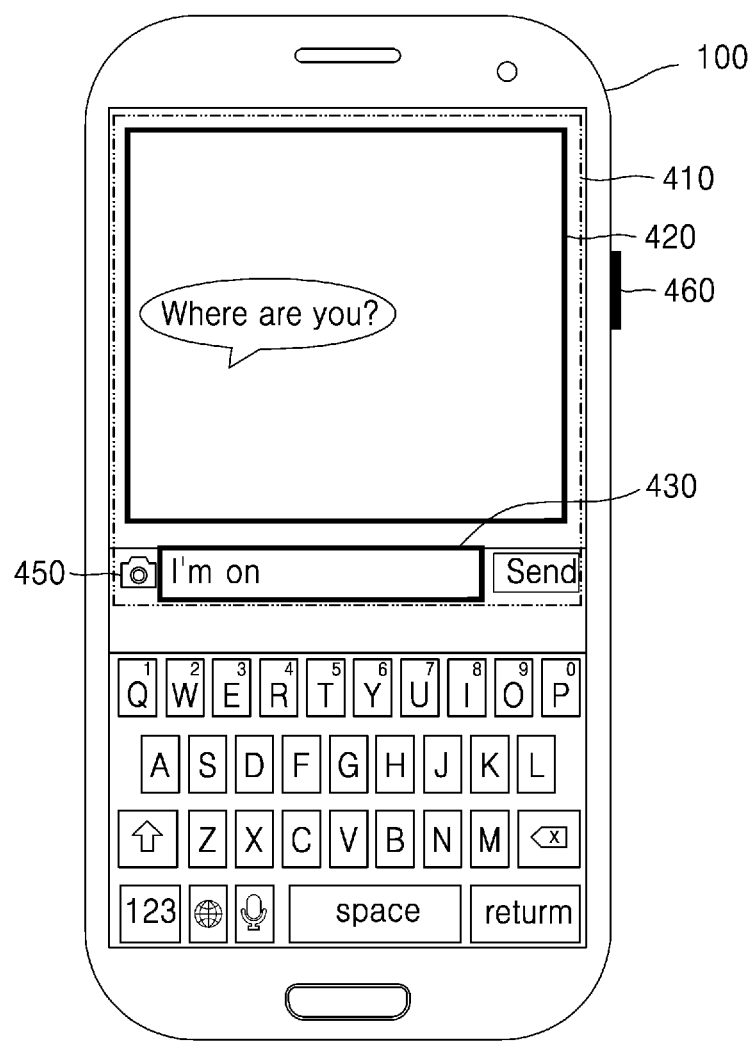

Referring to FIG. 5, a user of the electronic device (first user) may transmit and receive messages with a user of an external device (second user), and the electronic device 100 may display a message window 410. According to an embodiment, the message window 410 may include at least one of a text message window, an instant message window, an e-mail window, or a chat window, but is not limited thereto.

In addition, the message window 410 may include a message input area 430 and a message display area 420. In this case, the message input area 430 may refer to an area for inputting a message to be sent, and the message display area 420 may refer to an area for displaying a message for which transmission or reception is completed.

For example, the second user may send a message asking where the first user is (e.g., Where are you?), and the message sent by the second user may be displayed in the message display area 420.

At this time, the first user may, instead of typing a place where he or she is located in the message input area 430, input the place where he or she is located, by capturing an image of a place sign or the like around the first user.

As illustrated in FIG. 5, the message window 410 may further include a camera icon 450 in addition to the message display area 420 and the message input area 430. The camera icon 450 may be displayed near the message input area 430. Alternatively, the electronic device 100 may include a camera button 460, and the camera button 460 may be implemented as a hardware button.

When receiving an input of touching the capture icon 450 or an input of pressing the capture button 460, the electronic device 100 may capture an image of at least one object by driving the camera, as illustrated in FIG. 5.

Referring to FIG. 6, the electronic device 100 may display the image obtained by the image sensor on the display as a preview image. After focusing an object to be captured, the user may perform image-capturing by touching a capture button 510 displayed on the display. Alternatively, the user may perform image-capturing by focusing an object to be photographed and maintaining a focusing state for a preset time. Further, the electronic device 100 may display a captured image 520 on a display unit.

Figure 7:
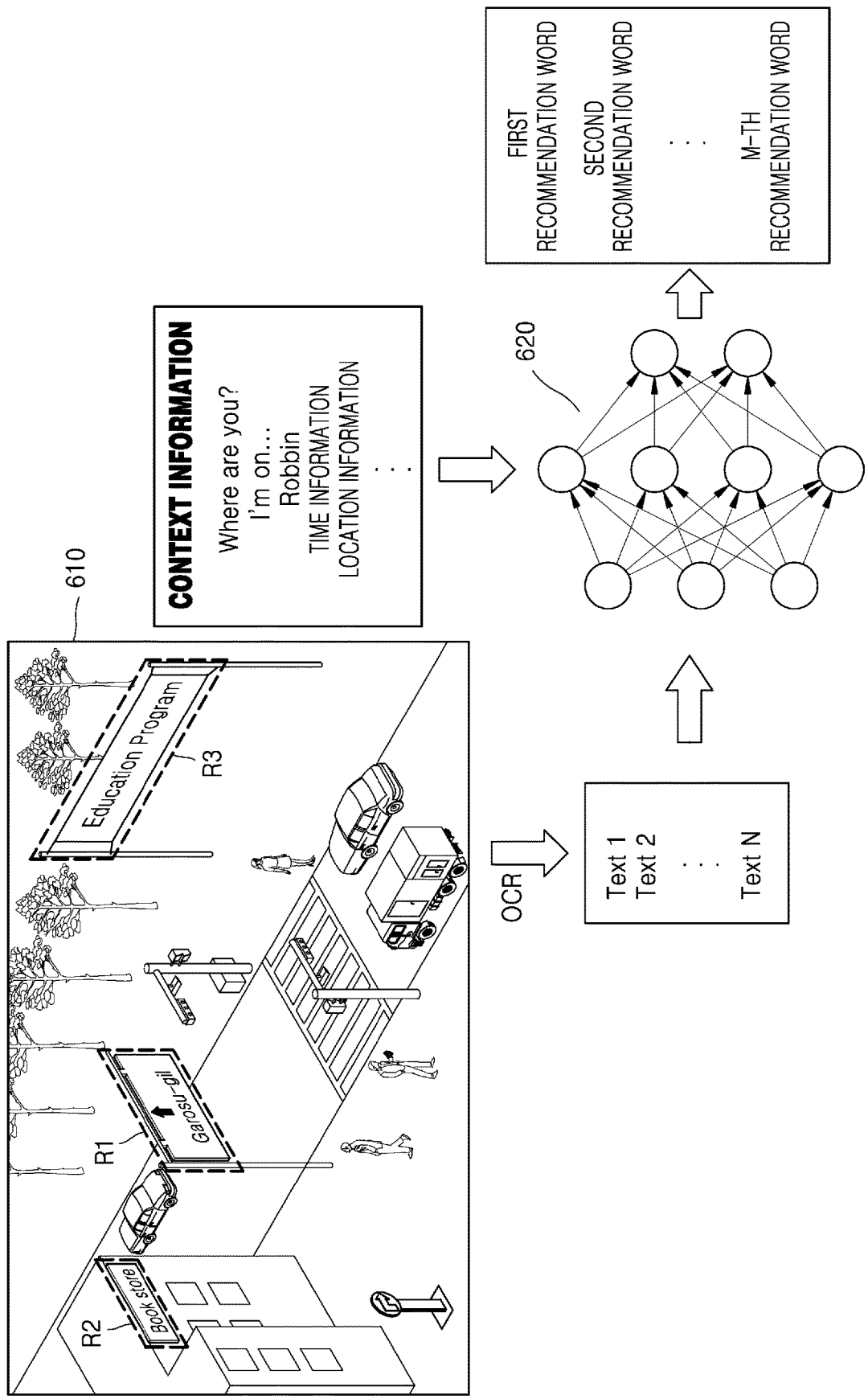

Referring to FIG. 7, the electronic device 100 may recognize at least one text included in a captured image 610, and may determine priority of the at least one text.

For example, the electronic device 100 may recognize text included in the image by using the OCR function. The electronic device 100 may divide the captured image into a plurality of areas, and recognize text by area. At this time, a priority of the plurality of areas may be determined based on whether a shape appearing in each of the plurality of areas is similar to the text and a position of each of the areas. In addition, text that is recognized in each of the plurality of areas having a priority may have the same priority as their corresponding areas. For example, the captured image is divided into a first area R1, a second area R2, and a third area R3, where the first area R1 has the first priority, the second area R2 has the third priority, and the third area R3 has the second priority, first text recognized in the first area R1 may have the first priority, second text recognized in the second area R2 may have the third priority, and third text recognized in the third area R3 may have the second priority. However, the embodiment is not limited thereto.

Alternatively, the electronic device 100 may determine a priority of the recognized text based on whether a shape of text appearing in the image is similar to the text, a position in the image of the text, a size of the text, an orientation of the text, a color of the text, a font, whether the recognized text is printed text or handwritten text, a type of language in the text, a category of the text, or the like. However, the embodiment is not limited thereto. For example, the electronic device 100 may set the highest priority for text recognized at a location closest to a center point of the image from among the recognized texts. Alternatively, the electronic device 100 may set the highest priority for the text having the largest size from among the recognized texts. Alternatively, the electronic device 100 may set the highest priority for text whose orientation is closest to a horizontal orientation from among the recognized texts. However, the embodiment is not limited thereto.

According to an embodiment, the electronic device 100 may include a language model 620, which may generate at least one recommendation words, based on at least one text recognized in the image and context information obtained from the electronic device 100.

For example, the context information may include time information of the electronic device, location information of the electronic device, information about the other party of the messaging (e.g., Robbin), the contents of a message received from the other party (e.g., Where are you?), and the contents of a message input in a message input area (e.g., I'm on").

The language model 620 may be a model that models a language used by human to calculate a degree to which a particular word string corresponds to an actually used language, as a probability. The language model 620 may be a model that predicts words or letters that are grammatically appropriate or highly probable, based on a dictionary, frequency of use, probability of use, and the like. For example, in a case of a language model of a character or word unit, the language model may predict the next letter or word based on the letters or words input so far. In addition, in a case of a language model of a sentence unit, the language model may predict a word included in a sentence in consideration of a comprehensive meaning or context of the sentence or paragraph.

The language model 620 may be a model based on a neural network. For example, a model such as a deep neural network (DNN), a recurrent neural network (RNN), or a bidirectional recurrent deep neural network (BRDNN) may be used as the language model 620, but is not limited thereto.

According to an embodiment, the electronic device 100 may change at least one text (Text 1, Text 2, . . . , Text N) recognized in the image into words matching the context information by using the language model 620. In addition, the electronic device 100 may re-determine a priority of the words in which a change is made, by using the language model 620.

For example, based on the contents of the message received from the other party (e.g., Where are you?) and the contents of the message input in a message input area (e.g., I'm on"), the electronic device 100 may predict that the next word to appear is a word related to a place. Accordingly, the electronic device 100 may determine words having high relevance to a place from among the at least one text may be determined as a recommendation word, and assign the corresponding priority. In addition, based on the location information of the electronic device 100, the electronic device 100 may determine words having high relevance to a current location information from among the at least one recognized text (Text 1, Text 2, . . . , Text N) as recommendation words, and assign the corresponding priority. However, the embodiment is not limited thereto.

Although not illustrated, according to an embodiment, the electronic device 100 may generate recommendation words by changing a type of language in the recognized text based on the language included in the message received from the other party and the language included in the message input to the message input area. For example, when the recognized text is 'Garosu-gil' written in English, and the messages transmitted and received between the first user and the second user are written in Korean (for example, "어디야?"), the electronic device 100 may generate '가로수길', which is obtained by converting 'Garosu-gil' into the Korean text, as a recommendation word. However, the embodiment is not limited thereto.

Figure 8:
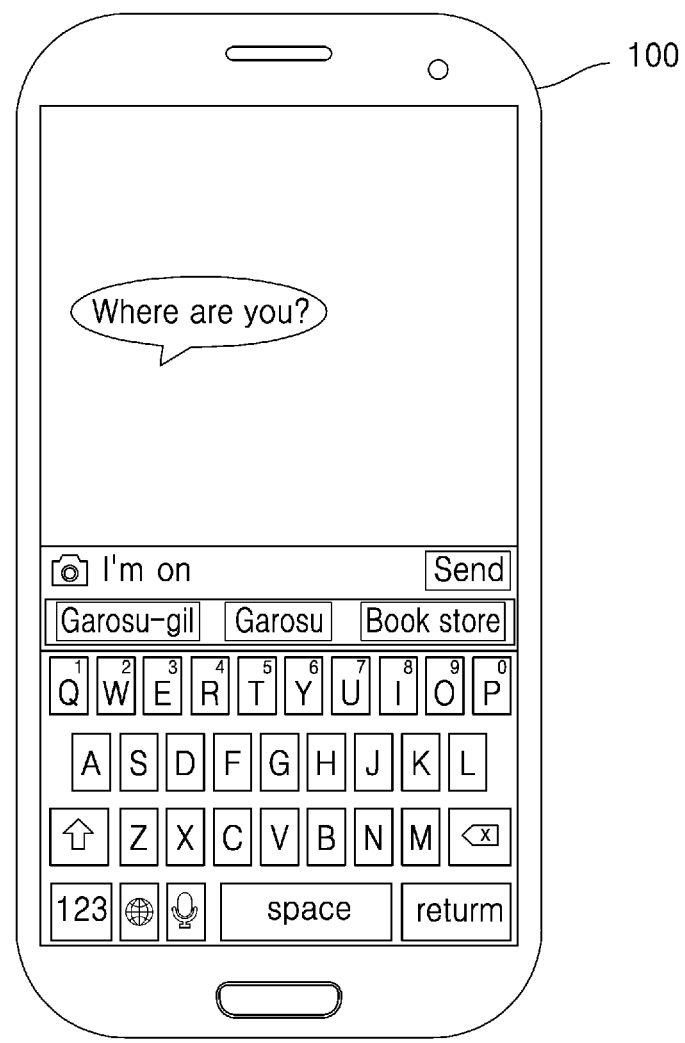
Figure 9:
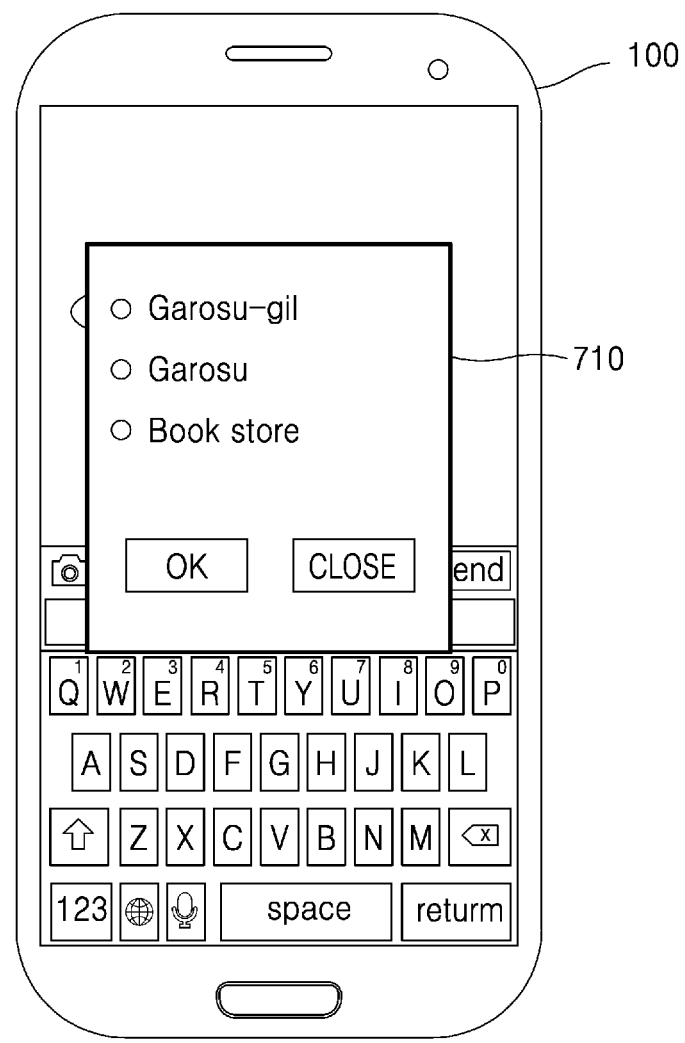

Referring to FIGS. 8 and 9, the electronic device 100 may display recommendation words generated using the language model, on the display unit.

For example, as illustrated in FIG. 8, the electronic device 100 may display recommendation words (e.g., 'Garosu-gil', 'Garosu', 'Book store', or the like) in the lower part of the message input area. In addition, according to a priority of the recommendation words, the electronic device 100 may display the recommendation words in an order of the first recommendation word (e.g., 'Garosu-gil') having the highest priority, the second recommendation word (e.g., 'Garosu') having the second priority, and the third recommendation word (e.g., 'Book store') having the third priority. However, the embodiment is not limited thereto.

In addition, as illustrated in FIG. 9, the electronic device 100 may display the recommendation words by using a pop-up window 710.

At this time, when a word to be input by the user is present among the recommendation words, the user may select the corresponding word and input an 'OK' button. On the other hand, when a word to be input by the user is not present among the recommendation words, the user may input a 'Close' button and terminate the displaying of the pop-up window 710.

Figure 10:

Referring to FIG. 10, according to an embodiment, the electronic device 100 may input a word selected from among the recommendation words into the message input area.

For example, when receiving a user input of selecting one of the displayed recommendation words in FIG. 8 or when receiving a user input of selecting one of the displayed recommendation words and selecting the 'OK' button in FIG. 9, the electronic device 100 may input the selected word ('Garosu-gil') into the message input area. In addition, the electronic device 100 may convert the selected word into another language type by using the language model and input the converted word. For example, when Korean language is included in a message transmitted and received with an external device and the selected word is 'Garosu-gil' written in English, the electronic device may convert the 'Garosu-gil' written in English into Korean, and input ' 가로수길 '.

Figure 11:
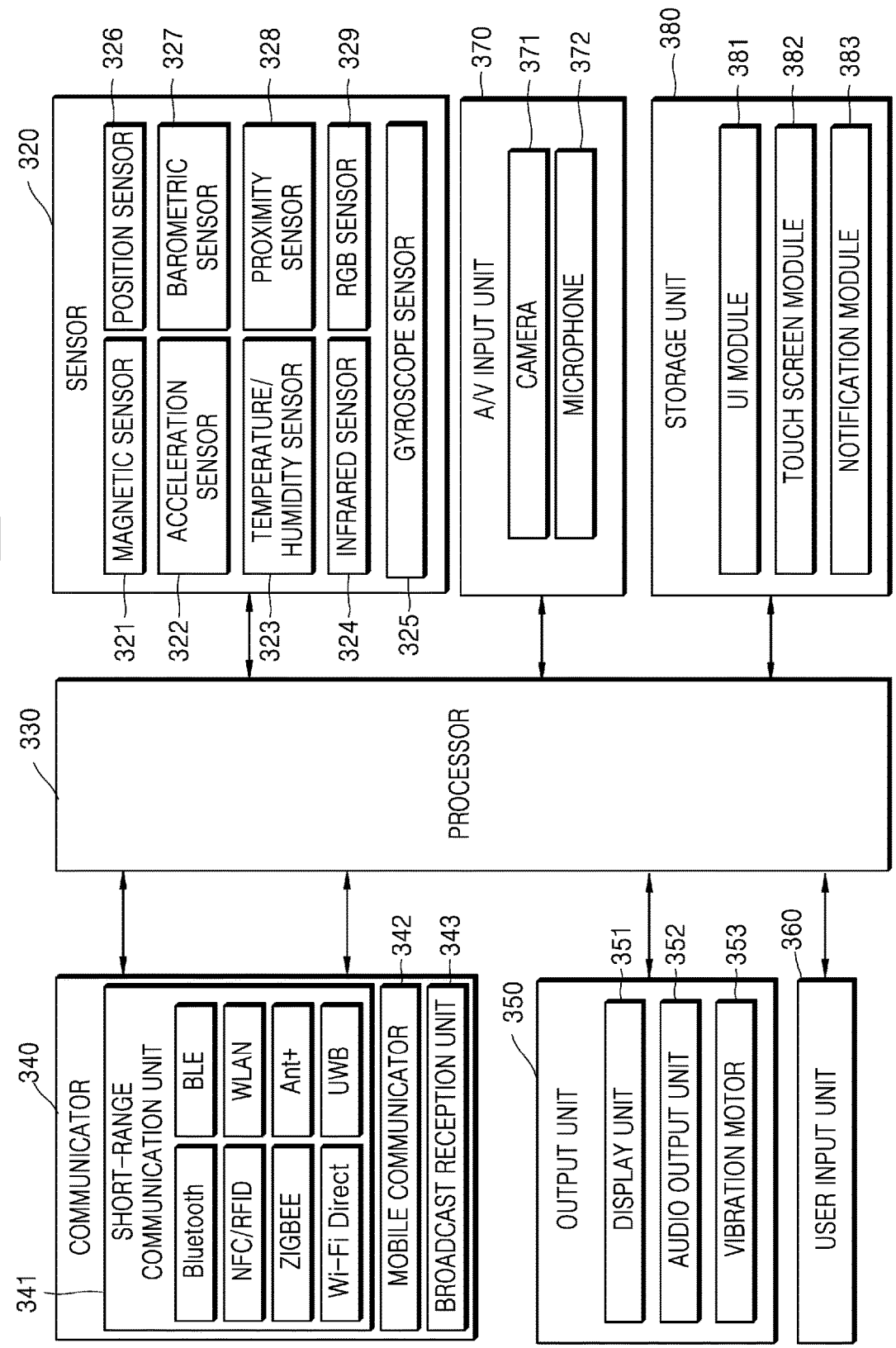
FIG. 11 is a block diagram illustrating a configuration of the electronic device, according to another embodiment.

FIG. 11 is a block diagram illustrating a configuration of the electronic device, according to another embodiment. An electronic device 300 of FIG. 11 may be an embodiment of an electronic device 100 of FIG. 1.

Referring to FIG. 11, according to an embodiment, the electronic device 300 may include a processor 330, a sensor 320, a communicator 340, an output unit 350, a user input unit 360, an audio/visual (A/V) input unit 370, and a storage unit 380.

The processor 330 of FIG. 11, the storage unit 380 of FIG. 11, and a display unit 351 of FIG. 11 may correspond to the processor 120 of FIG. 2, the memory 130 of FIG. 2, and the display 140 of FIG. 2, respectively. The contents identical to those described in FIG. 2 will be omitted in the description with reference to FIG. 11.

The communicator 340 may include one or more components for communication between the electronic device 300 and an external device (e.g., a server). For example, the communicator 340 may include a short-range communication unit 341, a mobile communicator 342, and a broadcast reception unit 343.

The short-range communication unit 341 may include a Bluetooth communication unit, a Near Field Communication unit, a Wireless LAN (Wi-Fi) communication unit, a Zigbee communication unit, an Infrared Data Association (IrDA) communication unit, a Wi-Fi Direct (WFD) communication unit, an ultra wideband (UWB) communication unit, and an Ant+ communication unit, but is not limited thereto.

The mobile communicator 342 transmits and receives wireless signals to and from at least one of a base station, an external terminal, or a server, on a mobile communication network. Here, the wireless signal may include various types of data according to transmission and reception of a voice call signal, a video call signal, or a text/multimedia message.

The broadcast reception unit 343 receives, from the outside, broadcast signals and/or broadcast-related information through a broadcast channel. The broadcast channel may include a satellite channel and a terrestrial channel. Depending on the embodiment, the electronic device 300 may not include the broadcast reception unit 343.

The communicator 340 may receive at least one image from an external device. Alternatively, the communicator 340 may request and receive a feature extraction model and a classification model from an external server. The communicator 340 may transmit a result of classification of a plurality of images to an external server, and receive an updated feature extraction model and an updated classification model based on the classification result.

The output unit 350 is for outputting an audio signal, video signal, or vibration signal, and may include a display unit 351, an audio output unit 352, a vibration motor 353, and the like. The display unit 351 has already been described with reference to FIG. 11, and thus, descriptions of the display unit 351 will be omitted here.

The audio output unit 352 outputs audio data received from the communicator 340 or stored in the storage unit 380. In addition, the audio output unit 352 outputs acoustic signals related to functions performed by the electronic device 100 (for example, call signal reception sound, message reception sound, and notification sound). The audio output unit 352 may include a speaker, a buzzer, and the like.

The vibration motor 353 may output a vibration signal. For example, the vibration motor 353 may output a vibration signal corresponding to the output of audio data or video data (e.g., call signal reception sound, message reception sound, or the like). In addition, the vibration motor 353 may output a vibration signal when touch is input to the touch screen.

The processor 330 controls the overall operation of the electronic device 300. For example, the processor 330 may control the communicator 340, the output unit 350, the user input unit 360, the sensor 320, and the A/V input unit 370 by executing programs stored in the storage unit 380.

The user input unit 360 refers to a means for inputting, by a user, data for controlling the electronic device 300. For example, the user input unit 360 may include a key pad, a dome switch, and a touch pad (capacitive overlay, pressure resistive overlay, infrared beam, surface acoustic wave, integral strain gauge, Piezo electric, or the like), a jog wheel, a jog switch, and the like, but is not limited thereto.

The sensor 320 may include not only a sensor that detects biometric information of a user, but also a sensor that detects a state of the electronic device 300 or a state around the electronic device 300. In addition, the sensor 320 may transmit information detected by a sensor to the processor 330.

The sensor 320 may include at least one from among a magnetic sensor, an acceleration sensor, a temperature/humidity sensor, an infrared sensor, a gyroscope sensor, a position sensor (e.g., a global positioning system (GPS)), a barometric sensor, a proximity sensor, and an RGB sensor (illuminance sensor), but is not limited thereto. A function of each sensor may be inferred intuitively by a person of skill in the art from the name, so detailed descriptions thereof will be omitted here.

The A/V input unit 370 is for inputting an audio signal or video signal, and may include a camera 371, a microphone 372, and the like. The camera 371 may obtain an image frame such as a still image, video, or the like through the image sensor in a video call mode or a capture mode. An image captured through the image sensor may be processed by the processor 330 or a separate image processor (not illustrated).

The image frame obtained by the camera 371 may be stored in the storage unit 380 or transmitted to the outside through the communicator 340. Two or more cameras 371 may be provided according to a configuration aspect of the electronic device 300.

The microphone 372 receives external acoustic signals, and processes the received external acoustic signals to electrical voice data. For example, the microphone 372 may receive an acoustic signal from an external device or speaker. The microphone 372 may employ various noise cancellation algorithms to remove noise generated in the process of receiving an external acoustic signal.

The storage unit 380 may store a program for processing and control of the processor 330, and may store input/output data (e.g., application, content, time zone information of an external device, address book, or the like).

The storage unit 380 may include a storage medium of a type of at least one of a flash memory type, a hard disk type, a multimedia card micro type, card-type memory (for example, Secure Digital (SD) or eXtreme Digital (XD) memory, or the like), random-access memory (RAM), static random-access memory (SRAM), read-only memory (ROM), electrically erasable programmable read-only memory (EEPROM), programmable read-only memory (PROM), magnetic memory, a magnetic disk, or an optical disk. In addition, the electronic device 300 may operate a web storage or cloud server that performs a storage function of the storage unit 380 on the Internet.

Programs stored in the storage unit 380 may be classified into a plurality of modules according to their functions, such as a user interface (UI) module 381, a touch screen module 382, a notification module 383, and the like.

The UI module 381 may provide a specialized UI, graphical user interface (GUI), and the like, which are linked to the electronic device 300 for each application. The touch screen module 382 may detect a touch gesture on a user's touch screen, and transmit information regarding the touch gesture to the processor 330.

The touch screen module 382 may recognize and analyze touch codes. The touch screen module 382 may be configured with separate hardware including a controller.

The notification module 383 may generate a signal for notifying an event occurring in the electronic device 300. Events occurring in the electronic device 300 include call signal reception, message reception, key signal input, schedule notification, and the like. The notification module 383 may output a notification signal in the form of a video signal through the display unit 351 or may output a notification signal in the form of an audio signal through the audio output unit 352 or may output a notification signal in the form of a vibration signal in the form of a vibration signal through the vibration motor 353.

Meanwhile, the block diagrams of the electronic devices 100 and 300 illustrated in FIGS. 2 and 11 are block diagrams for one embodiment. Each component of the block diagrams may be integrated, added, or omitted depending on the specifications of the electronic devices 100 and 300 that are actually implemented. That is, if necessary, two or more components may be combined into one component, or one component may be divided into two or more components. In addition, a function performed in each block is for describing the embodiments, and the particular operation or device does not limit the scope of the disclosure.

According to an embodiment, an operating method of the electronic device may be implemented in the form of program commands that may be executed through various computer means, and recorded on a computer-readable medium. The computer-readable medium may include program commands, data files, data structures, or the like alone or in combination. The program commands recorded on the medium may be specially designed and configured for the disclosure or may be known and available to a person of skill in computer software. The computer-readable recording medium includes, for example, magnetic media such as hard disks, floppy disks, and magnetic tapes, optical media such as compact disc read-only memory (CD-ROM), digital versatile discs (DVD), magneto-optical media such as floptical disks, and hardware devices specially configured to store and execute program commands, such as magneto-optical media, and ROM, RAM, flash memory, and the like. The program commands include, for example, not only machine language codes made by a compiler but also high-level language codes that may be executed by a computer by using an interpreter or the like.

Although the embodiments have been described in detail above, the scope of the disclosure is not limited thereto, and various modifications and improvements made by a person of skill in the art based on the basic idea of the disclosure defined in the following claims also fall within the scope of the disclosure.

The invention claimed is:

1. An electronic device comprising:
    a camera configured to capture an image of at least one object;
    a display;
    a memory storing one or more instructions; and
    a processor configured to execute the one or more instructions stored in the memory to:
        recognize at least one text included in the image received from the camera, generate one or more recommendation words having a priority based on the recognized at least one text and context information, and control the display to display the generated one or more recommendation words, according to the priority, wherein the context information includes at least one of time information of the electronic device, location information of the electronic device, contents of a message received from an external device, information about the external device, or contents of a message input to a message input area.

2. The electronic device of claim 1, wherein the processor is further configured to execute the one or more instructions to:

when the electronic device operates in a text input mode, control the display to display a text input window and a capture icon; and when receiving a user input of selecting the capture icon, drive the camera, and control the camera to capture the image of the at least one object.

3. The electronic device of claim 1, wherein the processor is further configured to execute the one or more instructions to change the recognized at least one text into a word matching the context information, by using a language model.

4. The electronic device of claim 1, wherein the processor is further configured to execute the one or more instructions to determine a priority of the recognized at least one text, based on at least one of a position of the at least one text in the image, a size of the at least one text, a color of the at least one text, or a type of the at least one text.

5. The electronic device of claim 1, wherein the processor is further configured to execute the one or more instructions to determine a priority of the one or more recommendation words, based on a category of the recognized at least one text and context information of text input to the electronic device.

6. The electronic device of claim 1, wherein, the electronic device is in a state of transmitting and receiving a message with the external device.

7. The electronic device of claim 1, wherein the processor is further configured to execute the one or more instructions to control the display to display the one or more recommendation words on the display in an order from a highest priority.

8. The electronic device of claim 1, wherein the processor is further configured to execute the one or more instructions to, when receiving a user input of selecting any one of the one or more recommendation words, control the selected recommendation word to be input to a text input window.

9. An operating method of an electronic device, the operating method comprising:

obtaining an image by capturing the image of at least one object;

recognizing at least one text included in the image;

generating one or more recommendation words having a priority, based on the recognized at least one text and context information; and displaying the generated one or more recommendation words, according to the priority, wherein the context information includes at least one of time information of the electronic device, location information of the electronic device, contents of a message received from an external device, information about the external device, or contents of a message input to a message input area.

10. The operating method of claim 9, further comprising displaying a text input window and a capture icon, when the electronic device operates in a text input mode, wherein the obtaining of the image by capturing the image of the at least one object comprises, when receiving a user input of selecting the capture icon, driving a camera and capturing the image of the at least one object.

11. The operating method of claim 9, wherein the generating of the one or more recommendation words having the priority comprises changing the recognized at least one text into a word matching the context information, by using a language model.

12. The operating method of claim 9, wherein the recognizing of the at least one text included in the image comprises determining a priority of the recognized at least one text, based on at least one of a position of the at least one text in the image, a size of the at least one text, a color of the at least one text, or a type of the at least one text.

13. The operating method of claim 9, wherein the generating of the one or more recommendation words having the priority comprises determining a priority of the one or more recommendation words, based on a category of the recognized at least one text and context information of text input to the electronic device.

14. The operating method of claim 9, wherein, the electronic device is in a state of transmitting and receiving a message with the external device.

15. A non-transitory computer-readable recording medium having recorded thereon a program for executing the operating method of claim 9 on a computer.

16. The operating method of claim 9, wherein the displaying of the generated one or more recommendation words, according to the priority comprises displaying a first recommendation word, of the one or more recommendation words, as having a highest priority based on the first recommendation word having a highest relevance to the location information of the electronic device.

17. The operating method of claim 16, wherein the first recommendation word comprises at least one of a name of a location or a name of a store.

* * * * *